United States Patent [19]

Skidmore

[11] 4,381,026
[45] Apr. 26, 1983

[54] TIRE COOLING STRUCTURE

[76] Inventor: Frank O. Skidmore, 2513 Third St., Cuyahoga Falls, Ohio 44221

[21] Appl. No.: 224,374

[22] Filed: Jan. 12, 1981

[51] Int. Cl.³ .................................................. B60C 19/06
[52] U.S. Cl. ................................. 152/153; 152/330 C; 152/381.3; 152/386; 165/41
[58] Field of Search .......... 152/153, 157, 158, 330 R, 152/330 RF, 330 C, 365, 378 R, 381.3, 386, 396, 397, 398, 366; 165/41; 301/5 BA

[56] References Cited

U.S. PATENT DOCUMENTS

| | | | |
|---|---|---|---|
| 3,113,604 | 12/1963 | Connor | 152/153 |
| 3,270,794 | 9/1966 | Skidmore | 152/153 |
| 3,462,198 | 8/1969 | Onufer | 301/5 BA |
| 4,159,730 | 7/1979 | Osada et al. | 152/381.3 |
| 4,163,466 | 8/1979 | Watts | 152/158 |

Primary Examiner—Edward C. Kimlin
Assistant Examiner—Thomas Bokan
Attorney, Agent, or Firm—Oldham, Oldham, Hudak, Weber & Sand Co.

[57] ABSTRACT

The present invention relates to a novel means placed internally of a tubeless type pneumatic tire, placed upon the drop center rim to effectively transfer heat from the crown and shoulder portions to the sidewalls and the mounting rim during rotational operation thereof by affecting puffs or forcing of the air adjacent the drop center rim up toward the tread and sidewall portions, effectively transferring heat from the tread and sidewall portions down into the heat sink provided by the rim.

11 Claims, 5 Drawing Figures

TIRE COOLING STRUCTURE

TECHNICAL FIELD

This invention is in the technical field of pneumatic tires.

BACKGROUND ART

This invention relates to an improved tire cooling structure and means over my previous U.S. Pat. No. 3,270,794, as well as the art cited against that patent; namely, U.S. Pat. Nos. 1,436,594; 1,464,590; 2,026,161; 2,166,927; 2,339,548; and 3,113,604.

Heretofore, it is well known that there have been many and various attempts made at external means to effect cooling of pneumatic tires. This prior art attempts to recognize that a rubber tire tends to become very hot, particularly in the tread, crown, and shoulder area portions during operation thereof, and more particularly operation at high speed on a fairly hot pavement. It has been shown by many and various tests that the ability to cool the tread and shoulder area rubber will greatly enhance the wear life of the tire, as well as preventing layer separation leading to blowouts. These prior art patents utilizing external cooling means have not proven highly effective, and have been expensive and cumbersome to install. Specifically, they have been too expensive to merit installation on automobile tires now in use today.

Nevertheless, it is a known fact that the mileage obtainable with an automobile, truck, or bus pneumatic tire may be greatly increased by being able to cool the temperature of tread and shoulder area portions during operation thereof at high speed. For example, a reduction in the operating temperature at the tread and shoulder area portions of between about 10 and about 20 percent will in most cases increase the wear life of the tire between about 50 and 100 percent. Thus, a simple, highly effective means to cool the tread, crown, and shoulder area portions of tires during operation thereof is needed by the art.

DISCLOSURE OF INVENTION

Therefore, it is the general object of the invention to overcome and avoid the foregoing and other difficulties of and objections to prior art practices by the provisions of means positioned internally of an inflated pneumatic tire to effect circulation of the fluid therein pressuring the tire to effectively transfer heat from the tread, crown, and shoulder area portions to the sidewalls and mounting rim.

A further object of the invention is to provide means operatively attached to a rim mounting of a pneumatic tubeless tire, which means is positioned internally of the fluid pressure cavity, and extends circumferentially around the rim to transfer the fluid pressure in streams directed substantially radially outwardly into the tire during rotational operation thereof on a vehicle to effectively force the cooler air adjacent the rim and sidewall portions towards the tread and shoulder portions of the tire to effect cooling thereof.

A further object of the invention is to provide means mounted internally of a pneumatic tire to continuously effectively circulate the fluid utilized for pressurization thereof from the tread portion in a path passing the sidewalls and the mounting rim during rotational operation of the tire.

The aforesaid objects of the invention and other objects which will become apparent as the description proceeds are achieved by providing in combination, a one-piece drop center rim, the rim having a bead well and substantially horizontal bead receiving flanges extending laterally from the well and integral therewith, tire bead retaining flanges extending substantially vertically from the edges of the bead receiving flanges and integral therewith, a wheel secured to the well of the rim, a pneumatic tire having a tread and sidewalls mounted on the rim and secured by the tire bead retaining flanges, and means operatively mounted to the drop center rim within the cavity defined by the tire and the rim to effectively agitate and cause multiple radially outwardly directed air paths from the bead well torward the tread and sidewalls and circulate the fluid providing pressure to the tire during rotational operation thereof to transfer heat generated at the tread to the sidewalls and the rim.

BRIEF DESCRIPTION OF DRAWINGS

For a better understanding of the invention, reference should be had to the accompanying drawings wherein.

BEST MODE FOR CARRYING OUT THE INVENTION

While it should be understood that the principles of the invention are adaptable to truck and bus pneumatic tires, the features of the invention are primarily adaptable to tubeless type automobile tires, and hence it has been so illustrated and will be so described.

Figure 1:
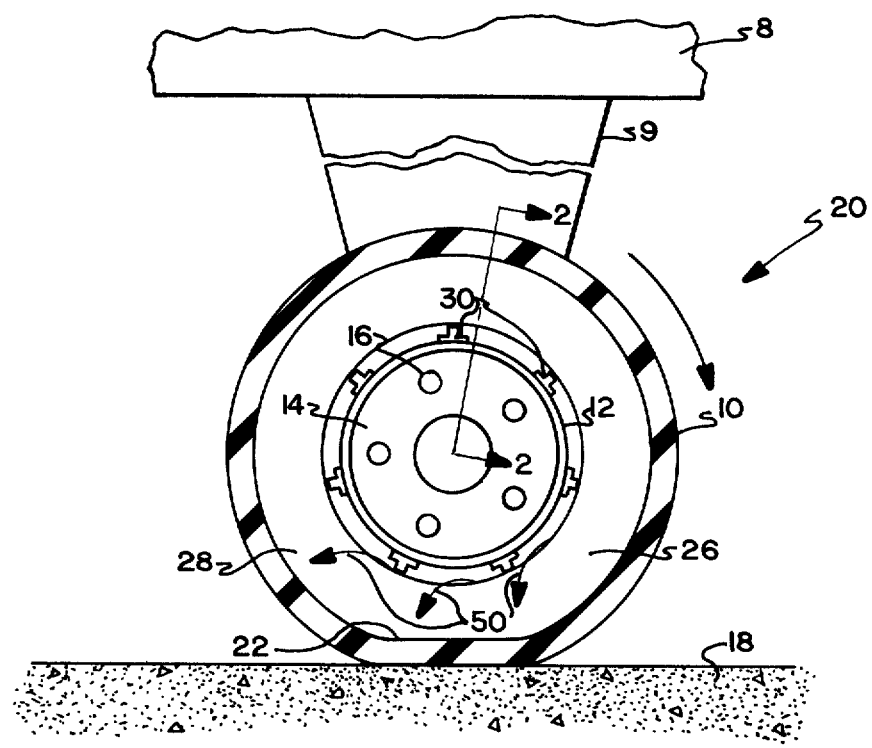
FIG. 1 is a vertical cross sectional view of a tubeless type pneumatic tire shown in rotating operating condition on the pavement, as carried by a vehicle which view illustrates one embodiment of the invention mounted to the rim internally to the tire to effect agitation and circulation of the fluid pressurizing the tire.

With reference to the form of the invention and illustrated FIG. 1 of the drawings, numeral 10 indicates generally a tubeless type pneumatic tire mounted to a conventional drop center rim 12, in the usual manner. The tire 10 is used to facilitate movement of a vehicle 8 and is mounted thereto by a support 9. The rim 12 has a drop center flange 14 with a plurality of bolt holes 16 adapted to mount over the brake hub of an automobile. It should be noted that the tire 10 is indicated in an operating condition as being loaded and passing over a roadway pavement 18 in a direction indicated by a tire rotation arrow 20. An exaggerated footprint area 22 is indicated along the point where the tire 10 contacts the surface of the pavement 18. It should be understood that at high speed, a tire rotating in the direction indicated by the arrow 20 and having a footprint area indicated by the area 22 will result in a specific area of fluid compression as indicated by the numeral 26, while an area of expansion will be experienced in that portion of the internal area of the tire indicated by the numeral 28. The tire 10 will actually have a shorter radius from the tread portion to the center of the rim or hub through the area of compression 26 than it will throughout the area of expansion 28. This is caused partially by the centrifugal force of the tire rotation, partially by the load on the tire, and partially by the forward movement of the vehicle carrying the tire. In other words, a bellows effect is constantly in action on the tire 10 causing the areas of compression 26 and expansion 28.

It should further be understood that there is a slight rotation or lagging of the air in the tire from the actual rotating speed of the tire itself, and hence, there is a continual relative movement between the air in the tire and all the surrounding portions of the tire and rim during rotative driving operation of the tire.

Figure 2:
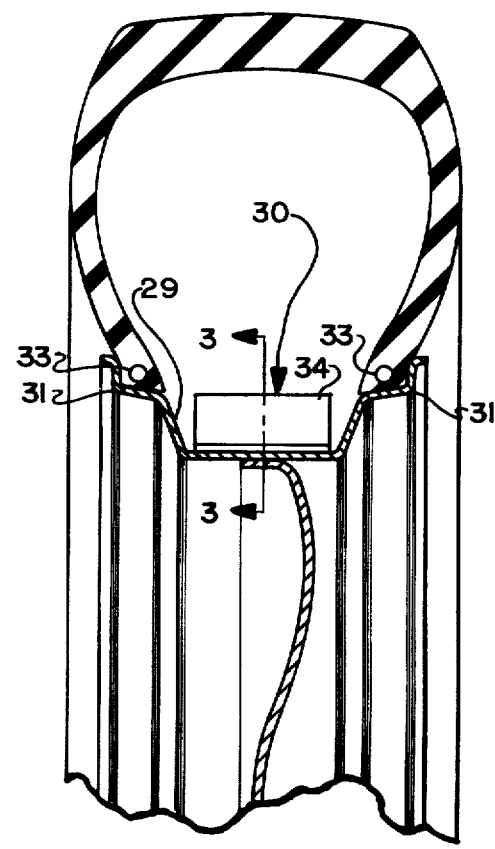
FIG. 2 is an enlarged vertical cross sectional view of the tire of FIG. 1, more specifically showing the location of the fluid agitation and circulation means, as taken on line 2—2 of FIG. 1.
Figure 3:
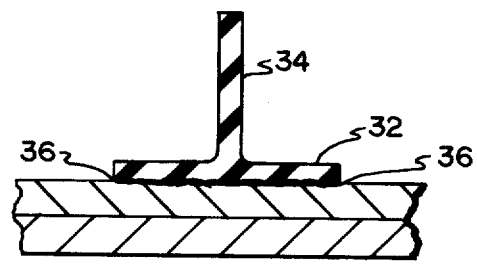
FIG. 3 is an enlarged vertical cross sectional view of the fluid agitation means as taken on line 3—3 of FIG. 2.

Therefore, in this embodiment, the objects of the invention are achieved by utilizing the compression area 26 and the expansion area 28 in conjunction with the rotative relative movement of the air within the tire. The use of these relative movements of air is achieved by a plurality of fluid agitation means indicated generally by numeral 30 that are positioned at the lowest radial point on the drop center rim within the cavity defined by the rim and the tire. The means 30 shown in FIG. 1 are basically an inverted T-shaped configuration having a base 32 and radially extending portion 34 with the radially extending portion going substantially the full height from the bottom of the drop center rim bead well 29 to the lower surface of the bead seat 31 for the tire, all as best seen in FIGS. 2 and 3. The radial portion 34 could be curved slightly to enhance fluid flow and circulation. The radially extending portion 34 will also cover the full width of the bead well portion of the drop center rim besides extending to the full height at the base of the bead seat. This particular positioning allows the tire 10 to be removed from the rim without the tire beads 33 interfering with the means 30. It is contemplated that the fluid agitation means 30 which are basically paddles or fins, but of no special construction, will be attached to the drop center rim by any type of suitable adhesive indicated generally by the numeral 36 in FIG. 3. In other words, the fins 30 cover substantially the full width and height of the bead well, but have sufficient radial clearance so as to not interfere with the mounting or removal of the tire to the rim.

Essentially, it is believed that the means 30 should be flexible or resilient and, hence, is indicated as being made from rubber or plastic so that any knocking or blows received to it will not break off the radial paddle portion or fin 34, and hence a suitable rubber or plastic cement 36 will achieve the adherence characteristics to the drop center rim as seen in FIG. 3. The embodiment shown in FIG. 3 is simply an extruded length of rubber or plastic to form the fin or paddle 34 with the lower flange portion 32 then being adhered by the adhesive 36 to the rim.

Figure 4:
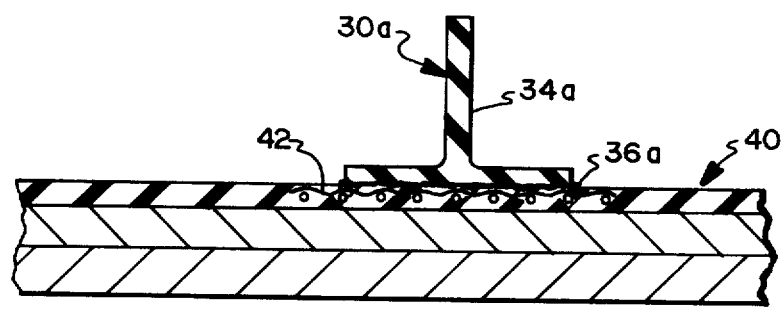
FIG. 4 is a view similar to FIG. 3 except showing a modified structure for the fluid agitation means.

In the embodiment shown in FIG. 4, the means 30a again is extruded and formed similarly to that shown in FIG. 3, but in this embodiment, it is attached adhesively to a stretchable band generally indicated by numeral 40 which can be then removably and elastically pulled over the edge of the rim and snapped down into the drop center portion and with the means 30a mounted to the band 40 along the length of its endless circumference as shown in FIG. 1. It has been found best to incorporate a non-stretchable cloth or scrim layer 42 into band 40 in the area of the paddle or fin, as shown in FIG. 4, so as to not stretch the adhesive bond at 36a to the band 40. Hence, in effect, the band 40 is intermittently stretchable. This particular type might be more applicable for a rim without a drop center portion, and even a truck or bus rim where the tire would be initially placed on the rim, then the band 40 slipped into position before the other removable flange of the rim is positioned to then hold the tire correctly with respect to the rim.

Figure 5:
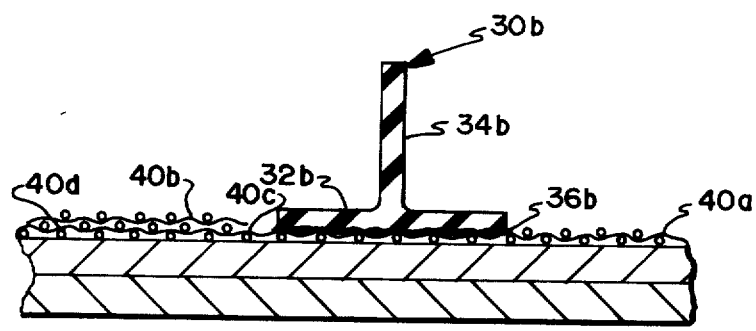
FIG. 5 is a view similar to FIGS. 3 and 4 except showing a further embodiment and modification of the fluid agitation means.

In the embodiment shown in FIG. 5, the band 40a is preferably all an open weave non-stretchable fabric, to which the means 30b are adhesively applied at 36b. The open mesh fabric or scrim allows better heat transfer to and from the rim. Here the band 40a will be wrapped circumferentially around the rim with the ends 40b and 40c overlapping and adhesively secured together as at 40d. The radially extending paddle or fin 34b is normally again of the same width and height as is generally indicated in FIGS. 1 and 2.

It is believed that the fluid agitation and circulation means 30 should be placed at equal intervals around the circumference of the drop center rim. The exact number and position of the means 30 will depend on the particular tire and rim characteristics, but can of course be very easily determined by routine testing procedures.

It should be understood, however, that the principal of the invention is to provide the very simple application of the radially extending paddle or fin 34 which tends to effect a radial or outward deflection of the air circulating through the compression zone 26 and the expansion zone 28 as is shown by the arrows 50 in FIG. 1 which will obviously then cause the air at the tread portion of the tire to be forced back down around to the drop center rim which acts as a heat sink and thus cools the operating temperature of the tread and sidewall portions of the tire. It has been found by some very simple testing of this concept that a significant reduction in operating temperature will occur that increases safety, as well as wear life of the tire as indicated above. For example, in a test of a tire under normal operating conditions ran at about 180° F., whereas with about six paddles or fins at about 60° spacing, the same time, at the same rotating speed, ran at an average of about 167° F.

While in accordance with the patent statutes, only the best known embodiments of the invention have been illustrated and described in detail, it is to be particularly understood that the invention is not limited thereto or thereby, but that the inventive scope is defined by the appended claims.

What is claimed is:
1. In combination,
- a standard one-piece drop center rim, said rim having a closed substantially flat well and substantially horizontal bead receiving flanges extending laterally from the well and integral therewith,
- tire bead retaining flanges extending substantially vertically from the edges of the bead receiving flanges and integral therewith,
- a radially inwardly projecting wheel secured to the well of the rim,
- a pneumatic tire having a tread and sidewalls mounted in fluid tight relation on the rim and secured by the tire bead retaining flanges, and
- a plurality of circumferentially spaced radially directed inverted T-shaped paddles mounted substantially perpendicular to the torus of the rim but across a substantial portion of the width thereof within the fluid tight cavity defined by the tire and the rim and spaced at a distance apart to effectively agitate the fluid providing pressure in the tire during rotational operation thereof in fluid streams directed from the rim towards the tread of the tire to transfer heat generated at the tread to the rim.

2. A combination according to claim 1, where such paddles are adhesively mounted directly to the rim.

3. A combination according to claim 1, where such paddles are carried by a band wrapped around the rim.

4. A combination as in claim 3, where the band has stretchable and non-stretchable portions with the means mounted to the non-stretchable portions.

5. A combination as in claim 3 where the band is an open weave fabric to allow heat transfer to and from the rim.

6. A combination as in claim 3 where the band is non-stretchable and is joined together at its ends.

7. A combination as in claim 6 where the ends of the band overlap and are joined together.

8. In combination,
a standard one-piece drop center rim, said rim having a closed substantially flat well and substantially horizontal bead receiving flanges extending laterally from the well and integral therewith,
tire bead retaining flanges extending substantially vertically from the edges of the bead receiving flanges and integral therewith,
a radially inwardly projecting wheel secured to the well of the rim,
a pneumatic tire having a tread and sidewalls mounted in fluid tight relation on the rim and secured by the tire bead retaining flanges, and the improvement which consists essentially of
a plurality of circumferentially spaced and circumferentially narrow radially directed paddles mounted substantially perpendicular to the surface of the flat wall of the rim but extending across a substantial portion of the width thereof within the fluid tight cavity defined by the tire and the rim and spaced at a distance apart to effectively agitate the fluid providing pressure in the tire during rotational operation thereof in fluid streams directed from the rim towards the tread of the tire to transfer heat generated at the tread to the rim and to other portions of the tire, said cavity being otherwise clear for fluid flow therein.

9. A combination as in claim 8 wherein said paddles are resilient.

10. A combination as in claims 8 or 9 where said paddles do not extend radially beyond the tire bead area and do not interfere with tire mounting or dismounting.

11. A combination as in claim 8 where said paddles are carried on a band positioned in said drop center of said rim.

* * * * *